United States Patent [19]
Shimizu et al.

[11] Patent Number: 5,565,952
[45] Date of Patent: Oct. 15, 1996

[54] PATRONE LOADING MECHANISM OF CAMERA

[75] Inventors: Tokuo Shimizu, Hachioji; Kazutoshi Shiratori, Hino, both of Japan

[73] Assignee: Olympus Optical Co., Ltd., Tokyo, Japan

[21] Appl. No.: 307,344

[22] Filed: Sep. 16, 1994

[30] Foreign Application Priority Data

Sep. 21, 1993 [JP] Japan .................... 5-235191

[51] Int. Cl.6 .................................................. G03B 17/02
[52] U.S. Cl. .................................................. 396/538
[58] Field of Search ........................ 354/202, 212, 354/214, 288, 275, 173.1, 173.11

[56] References Cited

U.S. PATENT DOCUMENTS

| | | | |
|---|---|---|---|
| 3,543,664 | 12/1970 | Kremp | 352/74 |
| 3,672,279 | 6/1972 | Hackenberg et al. | 352/74 |
| 4,330,190 | 5/1982 | Chan | 354/275 |
| 4,647,170 | 3/1987 | Stoneham | 354/295 |
| 4,697,899 | 10/1987 | Kawamura et al. | 354/173.11 |
| 4,841,319 | 6/1989 | Hansen | 354/275 |
| 4,860,041 | 8/1989 | Harvey | 354/212 |
| 4,887,114 | 12/1989 | Yamamoto et al. | 354/288 |
| 5,122,823 | 6/1992 | Baxter et al. | 354/212 |
| 5,142,316 | 8/1992 | Tani et al. | 354/212 |
| 5,155,514 | 10/1992 | Tamamura | 354/194 |
| 5,159,365 | 10/1992 | Takahashi et al. | 354/21 |
| 5,177,518 | 1/1993 | Taniguchi et al. | 354/174 |
| 5,179,402 | 1/1993 | Komatsuzaki | 354/212 |
| 5,231,438 | 7/1993 | Smart | 354/281 |
| 5,258,793 | 11/1993 | Tsuji et al. | 354/288 |
| 5,305,039 | 4/1994 | Dassero | 354/288 |
| 5,307,101 | 4/1994 | Tani et al. | 354/173.1 |
| 5,323,201 | 6/1994 | Richiuso et al. | 354/288 |

*Primary Examiner*—Michael L. Gellner
*Assistant Examiner*—Nicholas J. Tuccillo
*Attorney, Agent, or Firm*—Louis Weinstein

[57] ABSTRACT

A patrone loading mechanism of a camera for loading a patrone into a patrone chamber of a camera body by sliding the patrone in the direction at a right angle to the axis thereof is disclosed. The mechanism includes a patrone cover, an urging device comprising a patrone ejecting spring which urges the loaded patrone toward the direction for ejecting out of the camera and a patrone ejecting plate, a pawl which is locked with the patrone ejecting plate at a predetermined position when the patrone is loaded, a cam lever for undoing locking of the pawl by driving a hook plate regardless of the position of the patrone cover, and a take-up fork supported in such a manner that it moves in and out of a fork gear by a sliding of a fork plate which moves with the patrone cover.

11 Claims, 8 Drawing Sheets

PATRONE LOADING MECHANISM OF CAMERA

BACKGROUND OF THE INVENTION

1. Field of the Invention

The present invention relates to a patrone loading mechanism of a camera, and more particularly, to a patrone loading mechanism of a camera for loading a patrone by fitting it into a patrone chamber opening.

2. Description of the Related Art

Conventionally, various types of patrone loading mechanisms of a camera for loading a patrone by fitting it into a patrone chamber opening have been proposed.

For example, Japanese Unexamined Utility Model Publication No. 2-117527 discloses a patrone taking-out mechanism comprises rotating means for rotating a patrone in a photographing position so that a film outlet is projected from a circumference of a cylindrical film storage part in the state of closing a rear cover, in such a manner that it is in the taking-out position that the film outlet is projected from the patrone chamber to the rearward of the camera body; and means for operating the rotating means by moving with opening of the rear cover. Rotating of the patrone in such a manner that it is raised from the outlet of the patrone chamber to the rearward portion with opening operation of the rear cover allows the patrone to be easily taken out.

According to this prior art mechanism, however, it is not easy to take out the patrone when the patrone is small. And, a size of a stroke direction (thrust direction) of the take-up fork must be made larger than that of the same direction of the patrone in order to disengage the take-up fork from a film patrone.

Japanese Unexamined Utility Model Publication No. 2-102535 discloses a patrone taking-up mechanism in which projections are provided on the outer periphery of a film patrone; a patrone locking mechanism is provided in a patrone loading chamber of a camera; a film patrone is secured in the patrone loading chamber by the locking mechanism with its operation of pushing the film patrone into the loading chamber from a side face or a lower face of the camera; and locking is undone with operation of pushing the secured film patrone, whereby the film patrone is pushed out of the loading chamber.

According to this prior art mechanism, projections should be provided on the outer periphery of the patrone, and a special patrone is newly required. Thus, the prior art mechanism can not be applied to the generally used patrone. In addition, in order to perform loading and unloading of the patrone with operation of pushing into the patrone, means for releasing engagement of the patrone with the take-up fork is required. However, there is no description with respect to this take-up fork.

Further, Japanese Unexamined Patent Publication No. 4-80735 discloses a mechanism which comprises a patrone loading chamber having an ejecting position and a storing position capable of loading a patrone therein in which a take-up fork shaft is moved backward before starting movement from the ejecting position to the storing position.

According to this prior art mechanism, the patrone chamber should be movable to the storing position and the ejecting position, whereby a complex mechanism is required. This becomes a factor of increasing the cost, and further, it is difficult to downsize a camera. When the patrone is loaded, an eject lever has already been locked even before the patrone cover has been closed. Accordingly, the patrone can't be removed so long as the patrone cover is closed, even when the patrone is to be removed for some reason before closing the patrone cover. Therefore, when the prior art mechanism is applied to a film patrone which is recently proposed and which is a type of completely storing a tip of a film therein, it can't be found whether or not the used film is loaded, and there is a possibility of re-loading of the used film.

OBJECTS AND SUMMARY OF THE INVENTION

It is a first object of the present invention to provide a patrone loading mechanism of a camera which is excellent in operability.

It is a second object of the present invention to provide a patrone loading mechanism of a camera which is easy to take out a patrone and is excellent in operability.

It is a third object of the present invention to provide a patrone loading mechanism of a camera capable of reduction in the size of a patrone chamber.

It is a fourth object of the present invention to provide a patrone loading mechanism of a camera capable of reduction in the size of the axial direction of a patrone chamber.

It is a fifth object of the present invention to provide a patrone loading mechanism of a camera which means it easy to take out a patrone and is excellent in operability, and which has a high safety and reliability.

To put it briefly, a patrone loading mechanism of a camera according to the present invention comprises a patrone cover movable to positions for opening and closing a patrone chamber opening for loading a patrone therein, urging means for urging the loaded patrone in the direction to be ejected out of the patrone chamber opening, locking means for locking the urging means at a predetermined position to prevent the patrone from being ejected out of the patrone chamber opening when the patrone is being loaded in the patrone chamber against the urging force of the urging means, and unlocking means for unlocking the locking means.

These as well as other objects and advantages of the present invention will become further apparent from the following detailed explanation.

DETAILED DESCRIPTION OF THE PREFERRED EMBODIMENTS

The preferred embodiments of the present invention will be described with reference to the drawings.

FIGS. 1 to 12 show one embodiment of the present invention.

Figure 14:
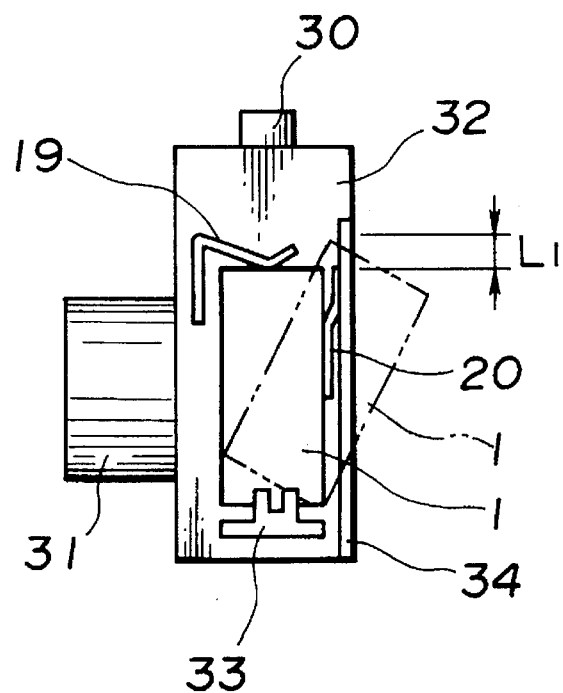
FIG. 14 illustrates a method of loading a patrone in a conventional camera viewed from the side sectional direction.
Figure 15:
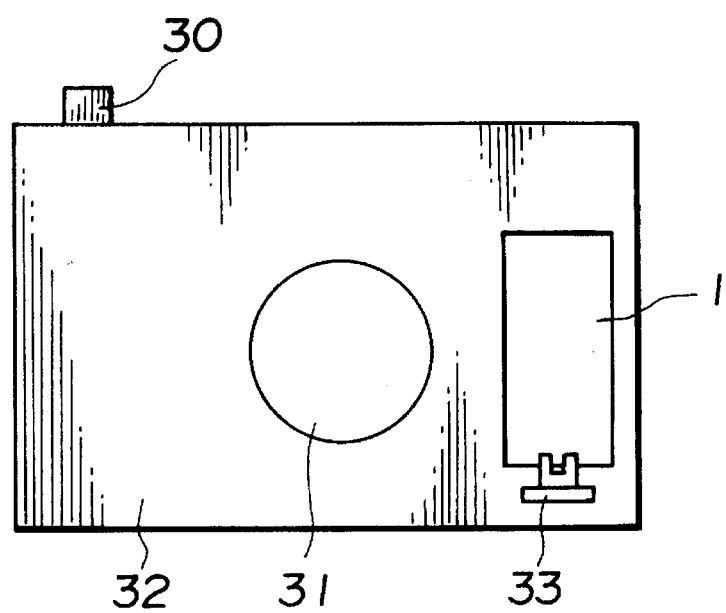
FIG. 15 illustrates a loading position of a patrone in the conventional camera viewed from the front direction thereof.

Firstly, the gist of this embodiment will be described with reference to FIGS. 1 and 2 while contrasting it with FIGS. 14 and 15 showing the prior art arrangement.

Figure 1:
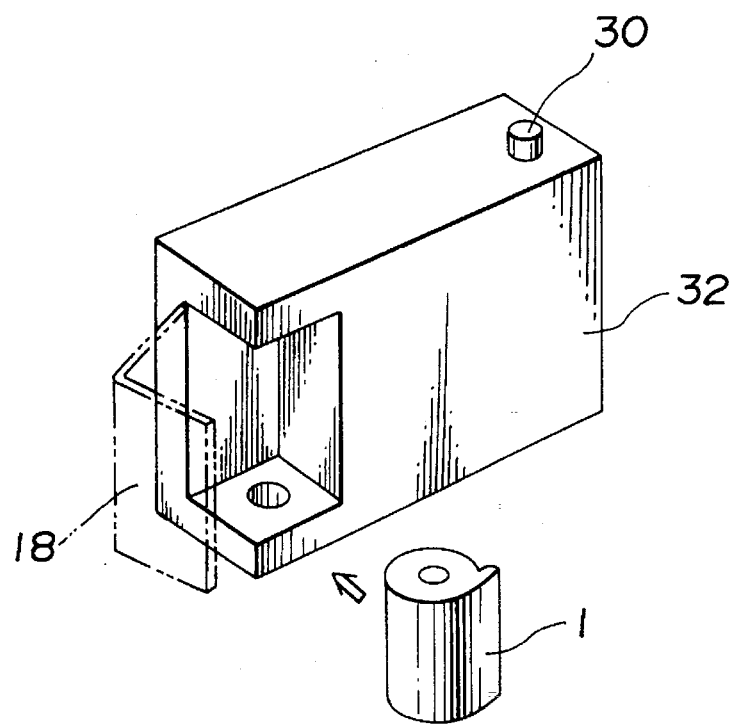
FIG. 1 is a perspective view showing an embodiment of a camera according to the present invention and a patrone to be loaded in the camera.

FIG. 1 is a perspective view showing the direction for loading a patrone into a camera of this embodiment.

A release button 30 is formed on the top face of a camera body 32, and a patrone cover 18 is formed at a left corner section of the rear face of the camera body 32 in such a manner that it can be opened and closed. The patrone cover 18 is formed of, for example, a plate member bent substantially at a right angle and extends from a side face to a rear face of the camera body 32. A patrone 1 is loaded sideways and is moved in a direction perpendicular to a patrone shaft, e.g. from a rear face toward the front of the camera and substantially parallel to a photographic optical axis.

In contrast to this, FIGS. 14 and 15 show a prior art device in which the patrone 1 is loaded from a side thereof. A lens barrel 31 supporting a photographic lens is projected from a center portion of the front face of the camera body 32, and the release button 30 is formed on the top face of the camera body 32. The patrone 1 loaded in the camera is urged by a patrone top spring 19 formed of, for example, a plate spring, toward a take-up fork 33, and is also urged by a patrone side spring 20 formed on a patrone cover 34 toward the front face of the camera.

In order to load and unload a patrone in the prior art as described above, the patrone 1 is tilted and is initially placed in a patrone chamber with a lower portion thereof engaging with the take-up fork 33 and then the upper end thereof is pushed into the chamber. Due to the tilt of the patrone 1 upon loading, the vertical size of the patrone chamber should be made longer than the size of the axial direction of the patrone 1 by the length L1 shown in FIG. 14.

Figure 2:
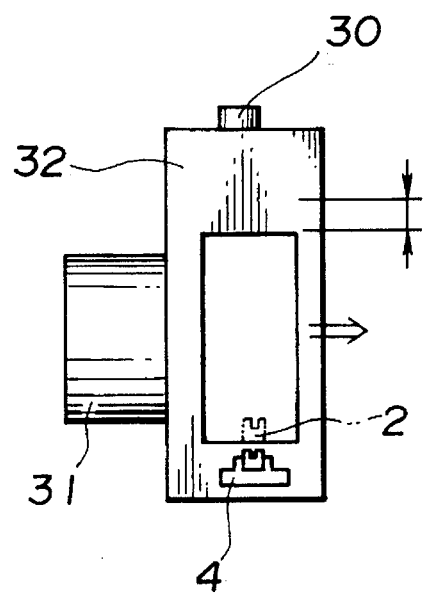
FIG. 2 illustrates a size of a patrone chamber of a camera according to the FIG. 1 embodiment of the present invention.

In this embodiment, as shown in FIG. 2, the take-up fork 2 supported by a fork gear 4 is sunk from the lower face of the patrone chamber when the patrone is loaded. This enables a reduction in the size of the patrone chamber to the extent that it is substantially the same size as that of the patrone.

The main constituents of this embodiment will be described with reference to FIG. 3.

A fork gear 4 transmits a rotation driving force received from a power transmission system (not shown), to the patrone 1. A cylinderical portion 4c having a somewhat smaller diameter is projected upwardly from a gear portion 4b meshed with the power transmission system (not shown), and at the upper end portion of the cylindrical portion 4c, fork gear slots 4a are provided at, for example, four positions dividing a circumference into four equal sections.

The take-up fork 2 which is the power transmitting means is integrated into the cylindrical portion 4c of the fork gear 4 through a spring 3. The take-up fork is always urged by the spring 3 toward the direction of ejection (upward of FIG. 3). The take-up fork 2 has take-up fork pins 2a projecting thereon at four positions dividing its circumference into four equal sections, and is constituted so as to be movable up and down within slots 4a and rotatable together with the fork gear 4 by being engaged with the fork gear slots 4a.

A fork plate 5 is provided between the take-up fork 2 and the patrone 1. The fork plate 5 presses the take-up fork pins 2a to bias them in order to be securely engaged with the fork gear slots 4a.

The fork plate 5 is an elongated plate member bent to have a central fork plate slope portion 5b. On elongated fork plate slit 5a to be engaged with the take-up fork 2 is formed in one end portion of the fork plate 5 and a fork plate mounting hole 5c is formed in the other end portion of the same, respectively. The plate 5 is rotatably mounted to a fork plate mounting portion 18b projected from the patrone cover 1 by screwing a machine screw or the like into a fork plate mounting hole 5c.

A fork plate cam face 17 is formed at a position opposite to the fork plate slope portion 5b of the fork plate 5.

Figure 3:
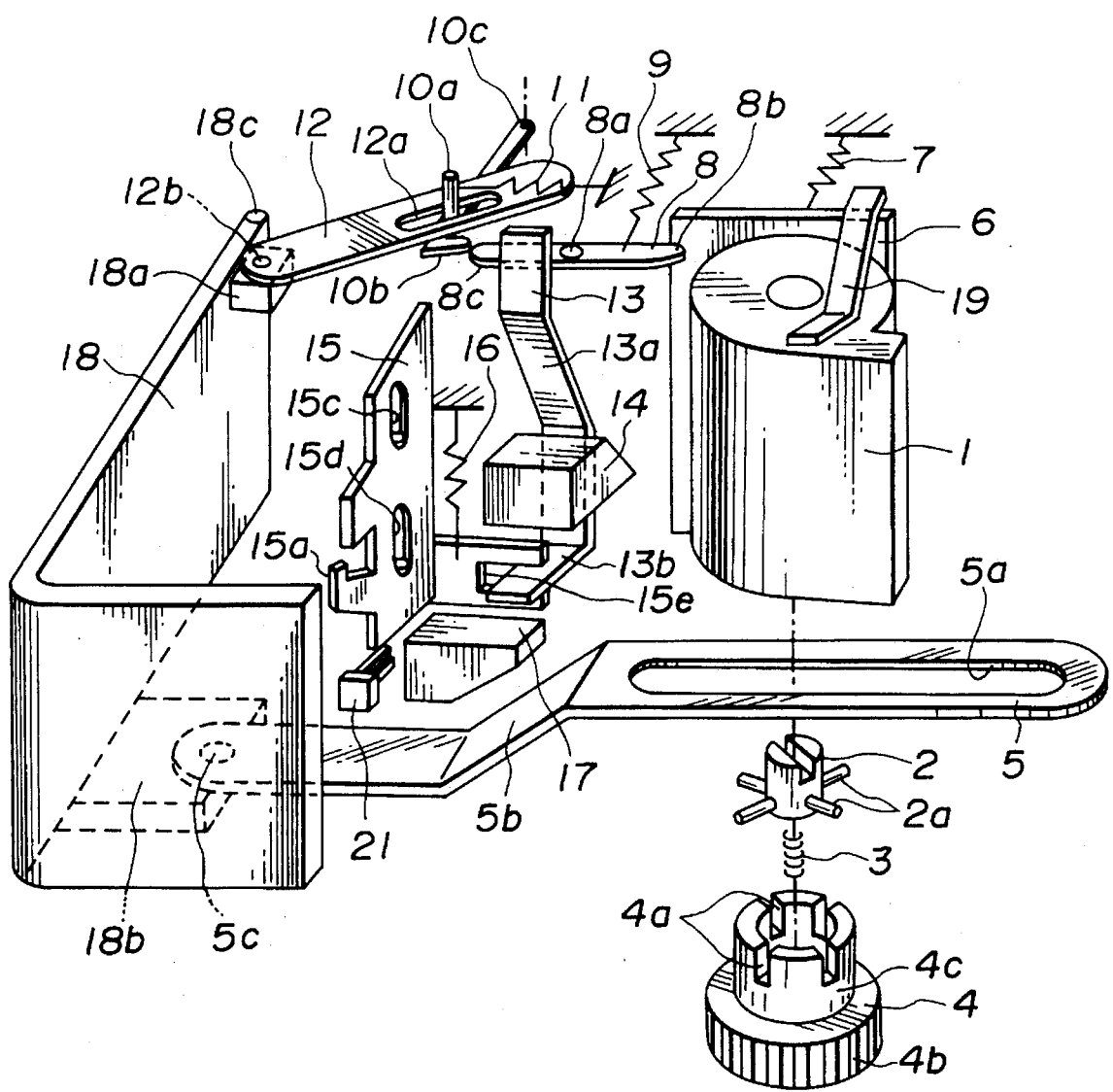
FIG. 3 is a perspective view showing a patrone loading mechanism of a camera according to the FIG. 1 embodiment of the present invention.

By this, the fork plate 5 moves to the left of FIG. 3 with operation for opening the patrone cover 18, and at this time, the fork plate slope portion 5b slides along the fork plate cam face 17 so that the fork plate slit 5a is lowered toward the take-up fork 2, and the take-up fork 2 is sunk into the cylindrical portion 4c of the fork gear 4.

In short, the take-up fork 2 is sunk by opening the patrone cover 18 by rotating it about a hinge portion 18c, and is raised by closing the patrone cover 18 (returned to the position to be engaged with the patrone 1).

On the other hand, the patrone 1 is urged by the; patrone top spring 19 toward the take-up fork 2, and a substantially rectangular patrone ejecting plate 6 is provided in the direction for loading the patrone 1 (for example, toward the front face of the camera). The patrone ejecting plate 6 is urged by a patrone ejecting spring 7 toward the direction for ejecting the patrone 1 out of the camera. In this way, an urging means is composed of the patrone ejecting plate 6 and the patrone ejecting spring 7.

The patrone ejecting plate 6 is locked with a pawl 8, which is a locking member. The pawl 8 is urged by a pawl spring 9, which is formed of an extension spring, toward a direction opposite to the urging direction of the patrone ejecting spring 7 while being supported by a rotary shaft 8a to be locked with the patrone ejecting plate 6 by its patrone side 8b. At the hook side of the pawl 8, a cam lever 13 constituting an unlocking means is provided so as to transmit to the pawl 8 a movement of a hook plate 15 also constituting an unlocking means to be described later.

The cam lever 13 which is formed by bending a beltlike plate member, comprises an upper end portion which is engaged with the pawl 8 as described above; a middle portion formed as a cam lever slope portion 13a; and a lower end portion formed as a cam lever bent portion 13b which is engaged with a hook lever engaging groove 15e described later.

A cam face 14 constituting an unlocking means is formed at a position opposite to the cam lever slope portion 13a of the cam lever 13.

A hook plate 15 has longitudinally elongated hook cam holes 15c and 15d arranged longitudinally side by side to be engaged with pins projected from the camera body. The hook plate 15 is capable of sliding up and down, and has a claw 15a projecting from its one side which locks a hook portion (not shown) of the patrone cover 18. Locking due to this claw 15a is undone by pressing down the cam lever bent portion 13b. Further, the hook plate 15 has hook lever engaging groove 15e at a portion projected perpendicular to a face of the hook plate 15 to be engaged with the cam lever bent portion 13b of the cam lever 13. The hook plate 15 is urged by a spring 16 toward the upper side of FIG. 3.

A switch 21 formed of, for example, a leaf switch for detecting up-and-down movement of the hook plate 15 is provided near a lower end portion of the hook plate 15. The switch is turned off when the hook plate 15 is at the raised position, and is turned on when the hook plate is at the lowered position. When the switch 21 is switched from on state to off state, a control means (not shown) judges that the patrone cover 18 is changed from open state to close state, and begins an auto-loading.

Near the pawl 8, a lock means 10 is provided at a position where it can be engaged with the hook side 8c of the pawl 8. The lock means 10 is an arm-like member rotatably supported about a lock shaft 10c, and urged by a lock spring 11 toward the pawl 8. The lock means 10 has a lock pin 10a projected from its upper surface, and a lock pawl 10b at it tip end portion. The lock pin 10a slidably engages an unlock plate cam slot 12a of an unlock plate 12 described later.

The unlock plate 12 is an elongated plate member having chamfered end portions at opposite ends thereof, and the unlock plate cam slot 12a as described above. The unlock plate 12 is rotatably mounted to an unlock plate mounting portion 18a provided on the patrone cover 18 by screwing a machine screw or the like into an unlock plate mounting hole 12b projected on one end portion of the unlock plate 12.

When the patrone cover 18 is closed, the unlock plate cam slot 12a does not particularly control the lock pin 10a. Thus, the lock means 10 is in the state that it is drawn to the pawl 8 by the lock spring 11.

Figure 11:
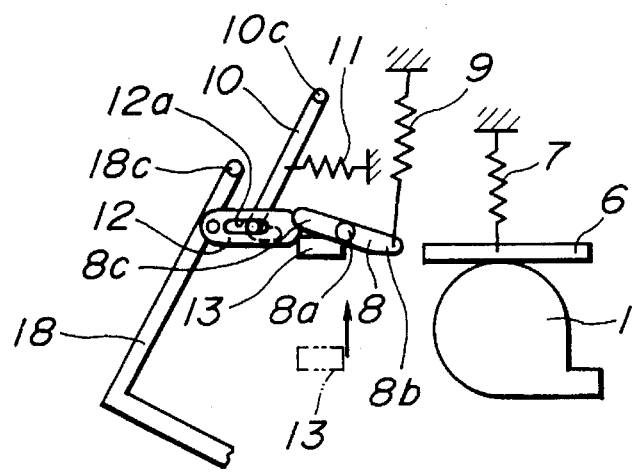
FIG. 11 is a plan view showing a main part of a patrone loading mechanism when the hook plate is moved downward in order to take out the patrone before closing the patrcone cover in the state shown in FIG. 7.
Figure 12:
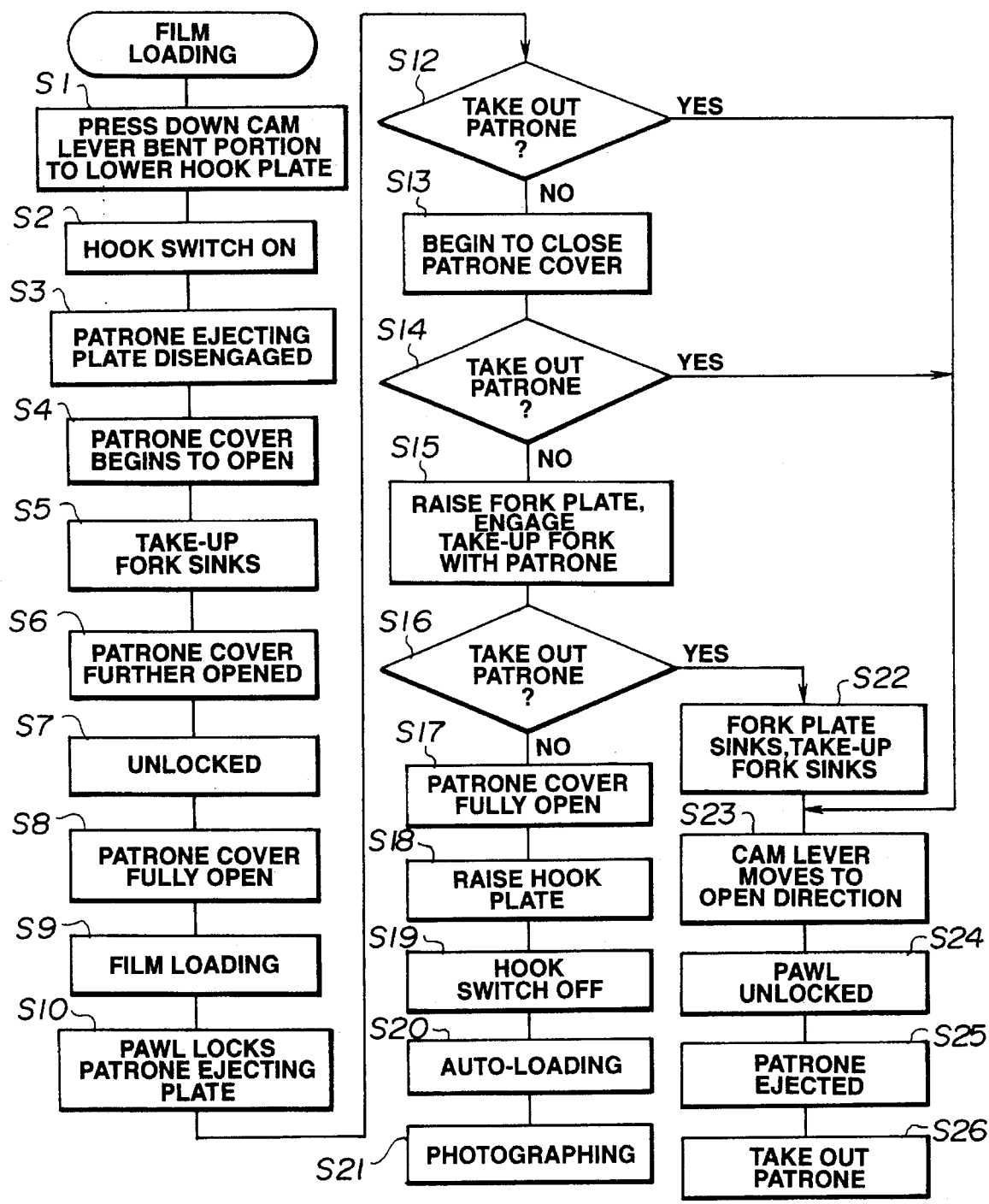
FIG. 12 is a flow chart showing an operation for loading a patrone in a camera according to the FIG. 1 embodiment of the present invention.
Figure 13:
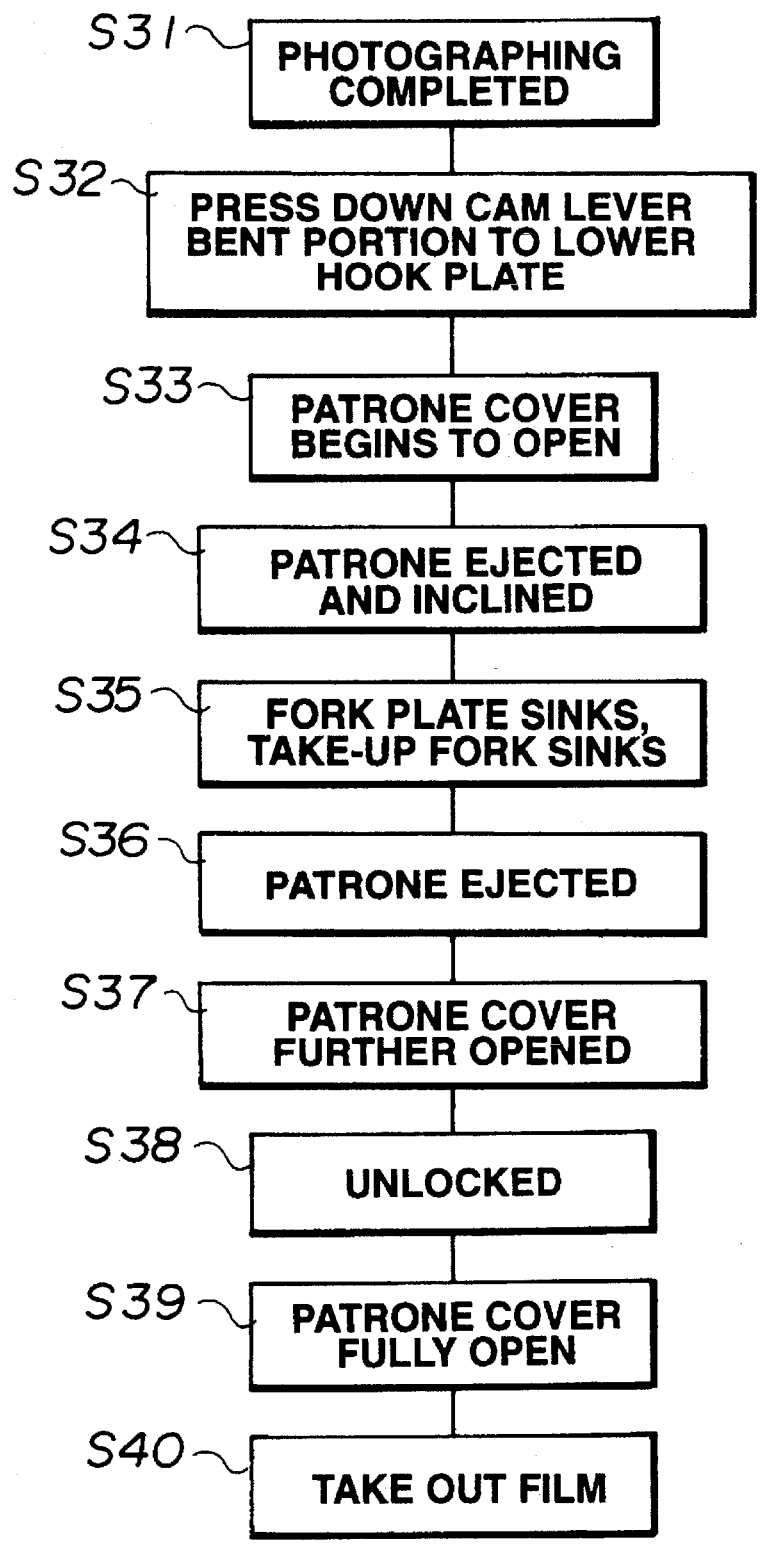
FIG. 13 is a flow chart showing operation for taking out a patrone from a camera according to the FIG. 1 embodiment of the present invention.

The action of the main part at the time of loading and unloading the patrone by opening/closing the patrone cover will be described with reference to FIGS. 4 to 11 and the flow charts of FIGS. 12 and 13.

Figure 4:
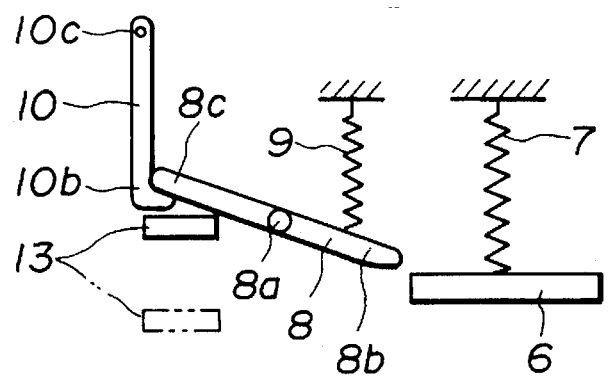
FIG. 4 is a plan view of a main part of a patrone loading mechanism showing the state that a pawl is locked with a lock means by a cam lever according to the FIG. 1 embodiment of the present invention.

When the patrone cover 18 is opened, the cam lever bent portion 13b is pressed down (step S1), the switch 21 is switched from on state to off state (step S2) and then, the hook plate 15 is moved downwardly due to the engagement of the cam lever bent portion 13b with the hook lever engaging groove 15e. At this time, the cam lever slope portion 13a slides along the cam face 14 provided on the camera body side so that the cam lever 13 pushes the hook side 8c of the pawl 8 toward the lock means 10 as shown in FIG. 4, and the tip of the hook side 8c of the pawl 8 is locked with the lock pawl 10b. At this time, since locking of the patrone ejecting plate 6 with the patrone side 8b of the pawl 8 is undone (step S3), the patrone ejecting plate 6 is urged toward the direction for ejecting the patrone 1. When the patrone 1 is not loaded, the patrone ejecting plate 6 is moved to the ejected position by the patrone ejecting spring 7.

When locking of the patrone cover 18 is undone due to the downward movement of the hook plate 15, and the patrone cover begins to open (step S4), the fork plate 5 slides to the left of FIG. 3 and the take-up fork 2 is sunk into the cylindrical portion 4c of the fork gear 4 (step S5) as described above. On the other hand, after the locking is undone as described above, the cam lever 13 is returned to the original position shown by the broken line (FIG. 4) by removing the pushing-down force to the cam lever bent portion 13.

Figure 5:
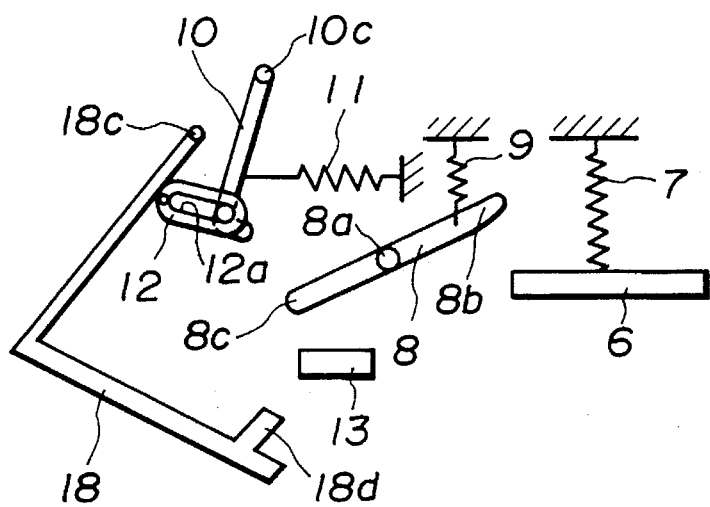
FIG. 5 is a plan view showing a main part of a patrone loading mechanism in the state that a patrone cover of a camera in which a patrone is not loaded is opened according to the FIG. 1 embodiment of the present invention.

When the patrone cover 18 is further opened (step S6), the unlock plate 12 mounted on the patrone cover 18 moves to the patrone cover side so that the unlock plate cam slot 12 pulls the lock pin 10a toward substantially the left of FIG. 5 against the lock spring 11. Then, locking of the hook side 8c of the pawl 8 with the lock pawl 10b of the lock means is undone (step S7), and the patrone side 8b of the pawl 8 is pulled by the pawl spring 9 to return to the free position. At this time, since the patrone ejecting plate 6 ejects the patrone 1, the patrone side 8b of the pawl 8 is not engaged with the patrone ejecting plate 6.

And, in the state that the patrone 1 is not loaded, the patrone cover 18 is fully open (step S8).

Figure 6:
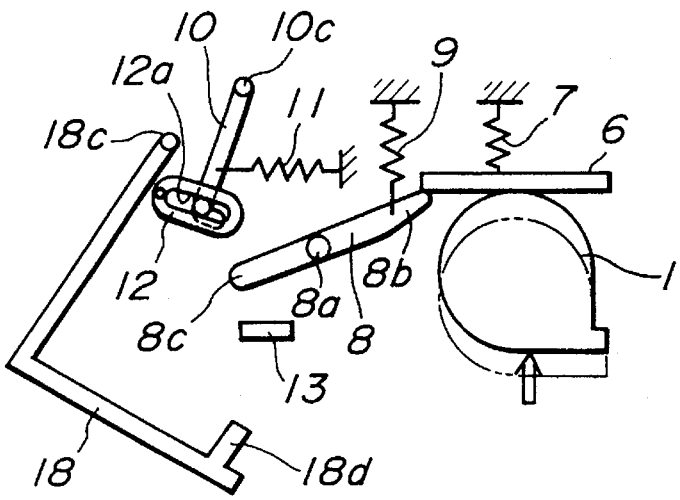
FIG. 6 is a plan view showing a main part of a patrone loading mechanism when a patrone is pushed thereinto in the state shown in FIG. 5.

FIG. 6 shows the state of loading the patrone 1 in the patrone chamber, which is in the state as shown in FIG. 5. The patrone 1 is pushed into the chamber sideways with respect to the patrone shaft, for example, from a rear face to the front face of the camera, as shown by the arrow in FIG. 6, whereby the patrone ejecting plate 6 is pushed into by the patrone 1 (step S9).

At this time, the patrone ejecting plate 6 moves from the patrone side 8b of the pawl 8 to the position shown in FIG. 6. When the pushing force applied against the patrone 1 is released, the patrone ejecting plate 6 is locked with the patrone side 8b of the pawl 8 (step S10). At this time, the urging force of the patrone ejecting spring 7 for pushing out the patrone ejecting plate 6, and the urging force of the pawl spring 9 for pulling the patrone ejecting plate 9 are substantially balanced, as shown in FIG. 7.

In case of taking out the patrone 1 in the state as described above (step S12), a procedure advances to the step S23 (see FIG. 11) described later. If not, the patrone cover 18 begins to close (step S13). In case of taking out the patrone 1 in the state that the patrone cover 18 begins to close (step S14), a procedure also advances to the step S23 described later. On the other hand, when the patrone cover 18 is further closed without entering an operation of taking out the patrone 1, the fork plate 5 slides to raise the take-up fork 2 to be engaged with the patrone 1 (step S15). When the patrone 1 is taken out in such a state as described above (step S16), the patrone cover 18 is opened again, whereby the fork plate 5 slides to sink the take-up fork 2 (step S22). After the take-up fork 2 is disengaged from the patrone 1, a procedure advances to the step S23 (see FIG. 11) described later.

Figure 7:
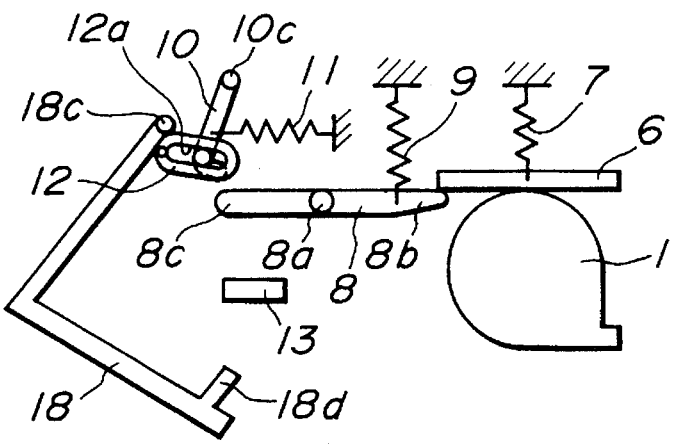
FIG. 7 is a plan view showing a main part of a patrone loading mechanism when a patrone ejecting plate is locked with a pawl in the state shown in FIG. 6.
Figure 8:
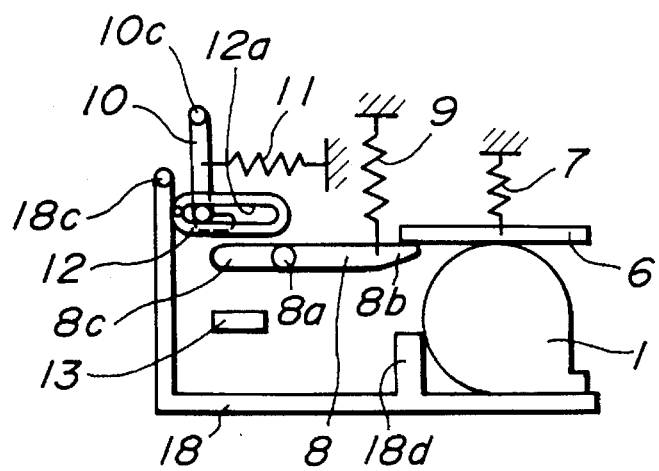
FIG. 8 is a plan view showing a main part of a patrone loading mechanism when the patrone cover is closed in the state shown in FIG. 7.
Figure 9:
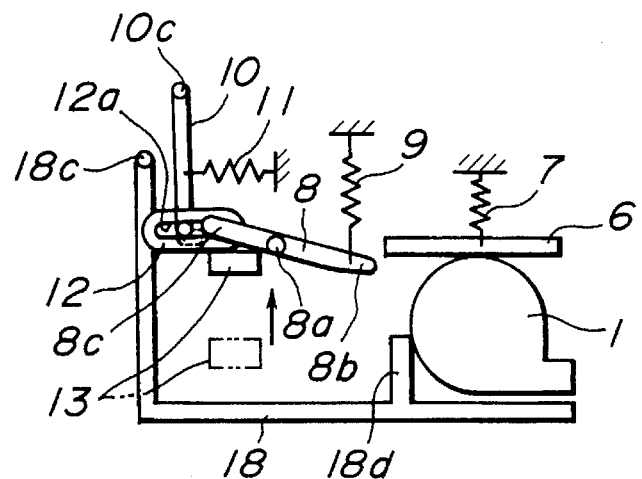
FIG. 9 is a plan view showing a main part of a patrone loading mechanism in the state that a hook plate is lowered so as to open the patrone cover of a camera according to the FIG. 1 embodiment of the present invention.

FIG. 8 shows the state of closing the patrone cover 18 after the state shown in FIG. 7. By closing the patrone cover 18, it is locked with the hook plate 15 (see FIG. 3) by means of the hook pawl 15a (steps S17 and S18).

At this time, since a gap is provided along the sliding dimension (downward) between the hook lever engaging groove 15e and the cam lever bent portion 13b, the cam lever bent portion 13b is not moved downwardly by closing the patrone cover 18.

A projection 18d holds the patrone 1 more securely and the patrone 1 is urged by a patrone cover spring (not shown). The switch 21 (see FIG. 3) is switched from on state to off state (step S19), and a control means (not shown) detects this and performs an auto-loading of the film (step S20). In the state shown in FIG. 8, a photographing or the like is usually carried out (step S21).

When a photographing is completed and a film is rewound (step S31), or when a film is rewound in the middle of a photographing for some reason, the patrone cover 18 is opened to take out the patrone 1. Thus, the cam lever bent portion 13b (see FIG. 3) of the cam lever 13 is pressed down (step S32).

By this, the cam lever 13 moves to push the hook side 8c of the pawl 8 to the lock means 10, whereby the hook side 8c is locked with the lock pawl 10b. Then, locking of the patrone side 8b of the pawl 8 with the patrone ejecting plate is undone and the patrone side 8b is held in the unlocked position. In short, the patrone 1 is urged by the patrone ejecting plate 6 toward the direction for ejecting thereof. Since locking of the patrone cover 18 with the hook plate 15 is undone, the patrone cover 18 is urged toward the direction for opening thereof.

When the patrone cover 18 begins to open (step S33), the patrone 1 is slightly inclined and ejected a little (step S34). Further, when the patrone cover 18 is opened, fork plate 5 slides and the take-up fork 2 is sunk (step S35), and the patrone 1 is ejected (step S36).

Figure 10:
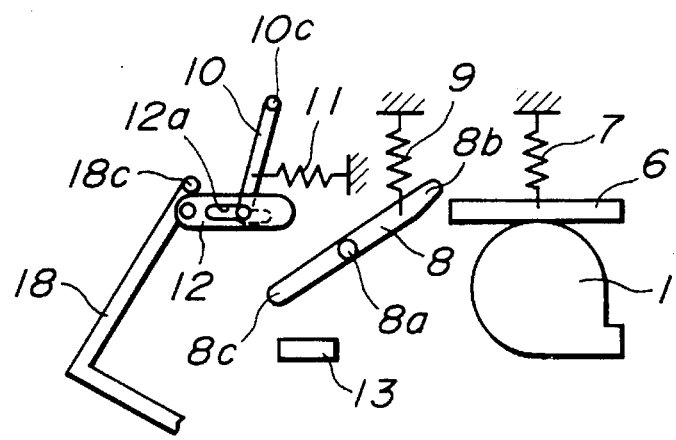
FIG. 10 is a plan view showing a main part of a patrone loading mechanism when the patrone cover is fully opened after the state shown in FIG. 9.

When the patrone cover 18 is further opened (step S37), the unlock plate 12 moves together with the patrone cover 18 and the hook side 8c of the pawl 8 is released from the lock pawl 10b of the lock means 10, whereby the pawl 8 is returned to the position shown in FIG. 10 (step S38). When the patrone cover 18 is fully open (step S39), the patrone 1 is easily taken out (step S40).

In order to load the next patrone successively, operation from the step S9 as described above may be repeated.

When the patrone 1 is to be removed in the state as shown in FIG. 7, in which the patrone 1 is loaded and the patrone cover 18 is not yet closed, the cam lever bent portion 13b is lowered to open the hook plate 15. Then, as shown in FIG. 11, the cam lever 13 pushes the hook side 8c of the pawl 8 toward the lock means 10 (step S23) to release the patrone ejecting plate 6 from the patrone side 8c of the pawl 8 (step S24), and the patrone ejecting plate 6 is projected by pushing out the patrone 1 (step S25), thereby removing the patrone 1 (step S26).

A patrone loading mechanism of a camera according to this embodiment offers the following advantages. A size of the patrone chamber can be made equal to that of the patrone in a camera loading and unloading the patrone in the direction at a right angle to the patrone rewind shaft. When it is found, before the patrone cover has been closed, that a used patrone has been erroneously loaded, the patrone can be ejected to such a position that it is easily removed, without first closing and then reopening the cover.

In this invention, it is apparent that working modes which differ over a wide range can be formed on the basis of this invention without departing from the spirit and scope of the invention. This invention is not restricted by any specific embodiment except as being limited by the appended claims.

What is claimed is:

1. A patrone loading mechanism of a camera, comprising:

a patrone cover movable to positions for opening and closing a patrone chamber opening for loading a patrone therein;

urging means for urging a loaded patrone in a direction so as to be ejected out of said patrone chamber through said patrone chamber opening;

locking means for locking said urging means at a predetermined position to prevent said urging means from applying a force for ejecting a patrone when a patrone being loaded in said patrone chamber against an urging force of said urging means moves to a predetermined position in said patrone chamber, said locking means maintaining urging means in a locked position even when said cover is fully open; and unlocking means for unlocking said locking means.

2. A patrone loading mechanism of a camera according to claim 1, wherein said urging means comprises a plate aligned substantially parallel to an axial direction of loading movement of the patrone to be loaded, and a spring member pressing against the plate, to move said plate in a direction transverse to said direction of loading movement.

3. A patrone loading mechanism of a camera according to claim 1, wherein said unlocking means further comprises a cover opening member for allowing the patrone cover to move its open position, and a releasing member which moves in a direction for unlocking said locking means by operation of said cover opening member.

4. A patrone loading mechanism of a camera according to claim 3 further comprising said cover locking member for locking said cover when in the closed position, said cover opening member substantially simultaneously unlocking said cover locking member when being moved to unlock said locking means releasing member.

5. A patrone loading mechanism of a camera according to claim 4, said camera further comprising a cam member having a cam follower surface slidably engaging said cam member to move the releasing member to an unlocked position when said cover opening member is moved in said unlocking direction.

6. A patrone loading mechanism of a camera according to claim 5, wherein one of said releasing members and said cover opening member have a flange and the other of said releasing member and said cover opening member has a slot, said flange being arranged in said slot, wherein movement of the releasing member is imparted to that cover opening member.

7. A patrone loading mechanism of a camera according to claim 6, wherein the camera is provided with a pin cooperating within the cover opening member to lock said cover.

8. A patrone loading mechanism of a camera according to claim 7, wherein said cover opening member is slidably mounted on said camera cover.

9. A patrone loading mechanism of a camera according to claim 8, further comprising an axially driving movable fork for driving a film from a cartridge loaded into the cartridge chamber, bias means normally urging the driving fork toward a patrone loaded into the cartridge chamber, means coupled to the cover for moving said driving fork away from a loaded patrone when the cover is opened and permitting the driving fork to be moved toward a loaded patrone when the cover is closed.

10. The loading mechanism of a camera according to claim 9, wherein said means for moving the driving fork further comprises a cam member and a fork plate coupled to said cover and having a cam following surface slidably engaging said cam member for causing the fork to move the driving plate toward and away from a loaded patrone as said cover is respectively moved between the open and closed positions.

11. The loading mechanism of a camera according to claim 10, wherein said driving fork is provided with a plurality of pins extending outwardly from the driving fork, said pins being slidable along slots arranged within a drive member for rotating the driving fork.

* * * * *